H. WEISS.
CONDIMENT DISPENSER.
APPLICATION FILED AUG. 12, 1916.
1,299,078.
Patented Apr. 1, 1919.
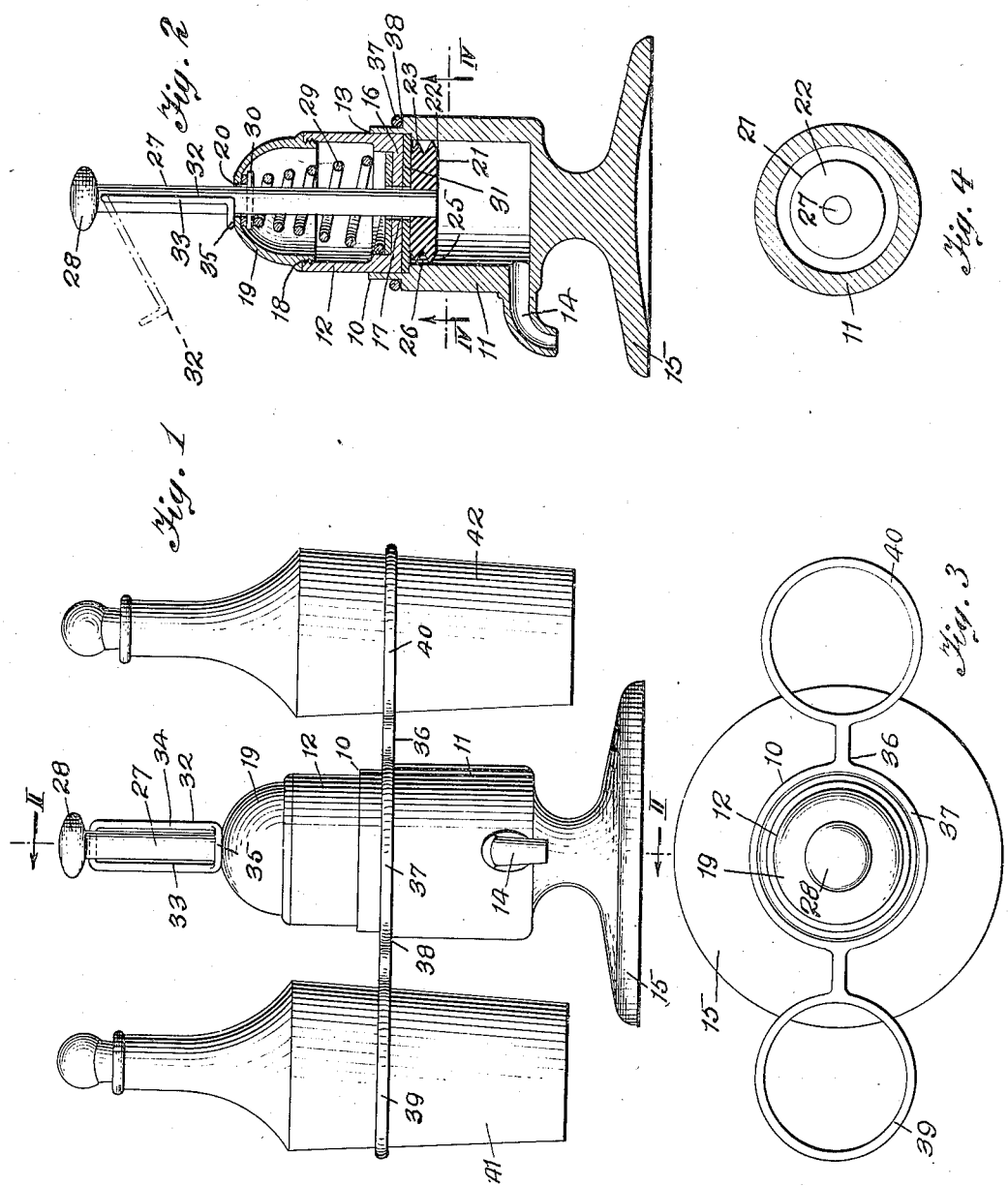
Inventor
Henry Weiss,
By his Attorney
W. T. Criswell

UNITED STATES PATENT OFFICE.

HENRY WEISS, OF NEW YORK, N. Y.

CONDIMENT-DISPENSER.

1,299,078.  Specification of Letters Patent.  Patented Apr. 1, 1919.

Application filed August 12, 1916. Serial No. 114,517.

*To all whom it may concern:*

Be it known that I, HENRY WEISS, a subject of the Emperor of Germany, and a resident of New York, county and State of New York, have invented a certain new and useful Improvement in Condiment-Dispensers, of which the following is a full, clear, and exact specification.

This invention relates more particularly to a class of articles adapted for use in dining rooms.

My invention has for its object primarily to provide an article designed to be employed for holding mustard, catsup and like condiments which are usually in the form of a semi-paste to be kept on a dining room table for use so as to be free of exposure to the air, and which is of a form whereby the contents may be dispensed in desired quantities without dripping from the article. The invention consists essentially of a container composed of two interfitting sections, one serving as a lower chamber with an open top, and having an outlet at its lower end, and the other section serving as an upper chamber. In the lower chamber is a piston with a stem projecting through the upper chamber so that the piston may be manually reciprocated for causing the contents of the lower chamber to be discharged through its outlet.

Other objects of the invention are to provide in the upper chamber a spring engaging the stem of the piston for manually forcing the piston upwardly in the lower chamber from its outlet; and to provide on the container a bracket for removably supporting bottles of vinegar, oil and the like.

A further object of the invention is to provide a condiment dispenser of a simple and efficient form which may be made in various sizes of plain or ornamental designs.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a front elevation of one form of condiment dispenser embodying my invention.

Fig. 2 is a section taken on the line II—II of Fig. 1.
Fig. 3 is a top plan of the device, and
Fig. 4 is a section taken on the line IV—IV of Fig. 2.

The condiment dispenser has a container 10 which may be of any desired shape and size and this container is preferably made of porcelain, or glass, though it may be made of any other material which will not be affected by mustard, catsup, or like dressings, or sauces when placed therein. The container 10 is composed of two interfitting sections 11 and 12, the section 12 serving as a lower chamber with an open top 13 and having at its lower end an outlet, as 14, which is in the form of a nipple extending laterally from the lower chamber, while on the underside of the lower chamber is a base, as 15, for supporting the container. The upper section 12 of the container 10 serves as an upper chamber, and this chamber is of a diameter so as to frictionally fit in the open top of the lower chamber 11 for being superposed on the lower chamber. The lower end of the upper chamber 12 is closed by a bottom 16 for serving as a closure to the top of the lower chamber 11, and through the center of this bottom is an opening 17. The upper chamber 12 also has an open top 18 which is closed by a lid 19 having an opening 20 in register with the opening 17 of the bottom 16 of this upper chamber.

In the lower chamber 11 of the container is reciprocably arranged a piston 21 which may be of any suitable type, though I prefer to employ a form of piston composed of two corresponding integral superposed disks 22 and 23 each having its peripheral edge beveled, at 25 and 26, in substantially a V-shape, as shown, and both of the disks are of diameters to fit snugly the interior of the lower chamber of the container as well as allowing free reciprocation thereof so that when the piston is forced downwardly in the lower chamber the contents therein will be discharged through the outlet 14. When the piston is reciprocably raised in the lower chamber its action will cause any of the contents remaining in the lower chamber as well as in the nipple of the outlet 14 to be suctionally drawn into the lower chamber, thereby preventing dripping of the contents from the nipple of the outlet. Projecting upwardly from the piston 21 is a stem 27 movably disposed through the opening 17 of the bottom of the upper chamber 12 and through the opening 20 of the lid 19 of this upper chamber. The stem 27 is of a length to extend above the upper chamber a distance corresponding substantially to the depth of the interior of the lower chamber of the container so that when the piston is forced downwardly its maximum distance the entire contents of the lower chamber will be discharged through the outlet 14, and the upper end of the stem 27 terminates with a head, as 28.

Serving to normally force the piston 21 upwardly in the lower chamber 11 of the container as well as forcing the stem 27 outwardly of the upper chamber 12, in the upper chamber is provided a spring 29 which is preferably of a spiral form encircling the stem. One end of the spring 29 is in engagement with the bottom 16 of the upper chamber of the container, while the upper end of the spring is secured, at 30, to the central part of the stem of the piston, so as to normally force the piston and stem upwardly in the container, and serving as a buffer to prevent the upper chamber from being accidentally disconnected from the lower chamber by the impact of the piston when forced upwardly in the lower chamber by the tension of the spring 29 after the piston is operated, between the piston and the bottom of the upper chamber may be arranged a yielding disk 31 of rubber, leather, or other cushioning material.

To use the device for permitting mustard, catsup and like condiments preferably in a semi-paste form to be conveniently dispensed on a dining table, a suitable quantity of the condiment is placed in the lower chamber 11 of the container 10 following the removal therefrom of the upper chamber 12 together with the piston. The upper chamber with the piston are then repositioned in the lower chamber, and when it is desired to use a quantity of the contents of the container the stem 27 of the piston is forced downwardly against the tension of the spring 29 for likewise guiding the piston 21 downwardly in the lower chamber. The contents will thereby be discharged through the outlet 14, and when sufficient quantity of the contents has been delivered by releasing the pressure on the stem of the piston the spring 29 will cause the piston to be reversely moved to the upper part of the lower chamber for subsequent operation.

When the device is not in use the piston 21, and its stem 27 may be releasably locked against operation by a clamp, as 32. The clamp 32 is preferably in the form of a straddle bar having two spaced parallel arms 33 and 34 having their lower ends bridged by a laterally extending curved transverse bar 35. The clamp or straddle bar is preferably made of spring wire, and the upper ends of its arms are pivotally held to opposite parts of the upper end of the stem of the piston under the head of the stem. The arms 33 and 34 may thereby be guided toward and from the sides of the stem of the piston, and these arms are of lengths so that when the arms are disposed on the sides of the piston stem the curved bar 35 will straddle the stem as well as engage the top of the lid 19 of the upper chamber of the casing. The piston will then be releasably locked against being operated, and to unlock this clamp the arms 33 and 34 together with the curved bar 35 are swung laterally from the stem of the piston to allow the piston to be operated.

To allow bottles containing vinegar, oil and the like to be removably mounted on the container for convenient use, I provide a bracket, as 36. The bracket 36 has a band, or ring 37 which is removably disposed on the container so as to be supported on an annular shoulder 38 extending from the upper part of the exterior of the wall of the lower chamber 11 of the container, and on opposite parts of the band 37 are two concentric members, or rings 39 and 40 extending in opposite directions laterally from the band. The rings 39 and 40 may be of any suitable sizes and shapes to permit bottles, as 41 and 42, or other articles to be removably mounted therein, and in this manner a simple and efficient device is provided for allowing condiments of various kinds to be kept on a dining table for convenient use when desired.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

The combination, in a condiment dispenser, of a container composed of two interfitting sections, one serving as a lower chamber with an open top, and having an outlet at its lower end, and the other section serving as an upper chamber with an apertured bottom to provide a closure for the top of the lower section, and having an open top, a lid closing the open top of the upper chamber, and having an opening in register with the aperture of the bottom of the upper chamber, a piston in the lower chamber, having a stem extending through the aperture of the bottom of the upper chamber as well as extending through the opening of the lid, so that the stem may be manually forced for reciprocating the piston to cause the contents of the lower chamber to be discharged through its outlet, a spring in the upper chamber engaging the stem of the piston for normally forcing the piston toward the top of the lower chamber, and a clamp on the part of the stem above the lid to releasably lock the stem and the piston against accidental operation.

This specification signed and witnessed this eleventh day of August A. D. 1916.

HENRY WEISS.

Witnesses:
GEORGE F. BENTLEY,
C. SHIEGLEY.